UNITED STATES PATENT OFFICE.

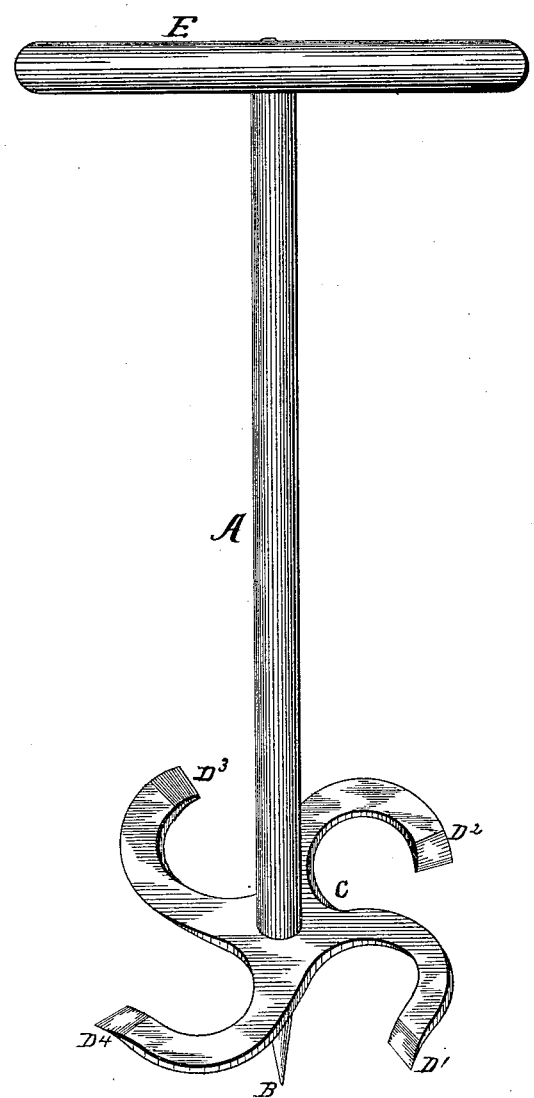

JAMES C. STALEY, OF GLADE MILLS, PENNSYLVANIA.

POST-HOLE DIGGER.

SPECIFICATION forming part of Letters Patent No. 350,167, dated October 5, 1886.

Application filed March 17, 1886. Serial No. 195,609. (No model.)

*To all whom it may concern:*

Be it known that I, JAMES C. STALEY, of Glade Mills, in the county of Butler and State of Pennsylvania, have invented a new and useful Earth-Auger; and I do hereby declare the following to be a full, clear, and exact description thereof.

My invention relates to an improvement in post-hole diggers; and it consists of a pointed vertical shaft provided with a handle and cutting-bit constructed of one piece with four cutting-points, the cutting-edge of which is on four different planes.

In the drawing, A is the vertical shaft, pointed as at B, and provided with a cutter, C, constructed in one piece, having four cutting-points, $D' D^2 D^3 D^4$, which cutting-points operate on different planes.

E is a handle secured on the upper end of the shaft A and at right angle thereto.

The operation is as follows: The operator forces the point B into the ground, then rotates the shaft A through the medium of the handle E, the cutting-point $D'$ enters the ground, and following it the cutter $D^2$ enters the ground, and following it the cutter $D^3$ enters the ground, and following it the cutter $D^4$ enters the ground, thereby gradually cutting up the earth, which, at suitable intervals, is withdrawn by withdrawing the digger from the hole formed. The digger is again inserted and the operation repeated until the post-hole is of the desired depth.

Having thus described my improvement, what I claim is—

In an earth-auger such as described, the cutting-blades formed from one piece of metal, each blade being inclined at a different angle from the adjoining blades, and the said piece of metal being provided with a perforation in the center for the reception of a handle, substantially as shown and described.

In testimony whereof I have hereunto set my hand this 23d day of June, A. D. 1885.

JAMES C. STALEY.

Witnesses:
 A. C. JOHNSTON,
 C. S. JOHNSTON.